United States Patent
Oppleman et al.

(10) Patent No.: US 11,949,646 B2
(45) Date of Patent: *Apr. 2, 2024

(54) CORRELATING PROTOCOL DATA UNITS TRANSITING NETWORKS WITH DIFFERING ADDRESSING SCHEMES

(71) Applicant: Packet Forensics, LLC, Virginia Beach, VA (US)

(72) Inventors: Victor Oppleman, Virginia Beach, VA (US); Daniel Ghiringhelli, Fort Mill, SC (US); Zachary Kanner, Virginia Beach, VA (US); Kristoffer Odland, Virginia Beach, VA (US)

(73) Assignee: PACKET FORENSICS, LLC, Virginia Beach, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/884,122

(22) Filed: Aug. 9, 2022

(65) Prior Publication Data

US 2024/0056414 A1 Feb. 15, 2024

(51) Int. Cl.
*H04L 61/256* (2022.01)
*H04L 43/08* (2022.01)

(52) U.S. Cl.
CPC ............ *H04L 61/256* (2013.01); *H04L 43/08* (2013.01)

(58) Field of Classification Search
CPC .................................................... H04L 61/256
See application file for complete search history.

(56) References Cited

U.S. PATENT DOCUMENTS

| | | |
|---|---|---|
| 5,636,216 A | 6/1997 | Fox et al. |
| 6,128,664 A | 10/2000 | Yanagidate et al. |
| 9,013,992 B2 | 4/2015 | Perkins |

(Continued)

FOREIGN PATENT DOCUMENTS

| | | |
|---|---|---|
| EP | 1054529 A2 | 11/2000 |
| EP | 3646562 A1 | 5/2020 |

(Continued)

OTHER PUBLICATIONS

Office Action issued in U.S. Appl. No. 17/942,708 dated Jan. 13, 2023, 17 pages.

(Continued)

*Primary Examiner* — Ryan J Jakovac
(74) *Attorney, Agent, or Firm* — MH2 TECHNOLOGY LAW GROUP, LLP

(57) ABSTRACT

A computer-implemented method of identifying associated communications between a first network with a first addressing scheme and a second network with a second addressing scheme is presented. The technique can include: detecting a first protocol data unit addressed from a first device in the first network and addressed to a destination in the second network, prior to translation by a network address translator; inserting, prior to translation from the first addressing scheme to the second addressing scheme, a breadcrumb protocol data unit that is addressed to the second network, the breadcrumb protocol data unit including, in a location immune from address translation by the network address translator, the source address of the first protocol data unit; receiving a translated breadcrumb protocol data unit; and reporting an association of the source address of the first protocol data unit with the translated source address of the first protocol data unit.

28 Claims, 11 Drawing Sheets

(56) References Cited

U.S. PATENT DOCUMENTS

| | | |
|---|---|---|
| 10,868,797 B1 | 12/2020 | Lin et al. |
| 11,770,360 B1 | 9/2023 | Oppleman et al. |
| 2011/0145391 A1 | 6/2011 | Ivershen |
| 2014/0280825 A1 | 9/2014 | Agrawal et al. |
| 2016/0094586 A1 | 3/2016 | Gunnalan et al. |
| 2019/0068468 A1 | 2/2019 | Baldi et al. |
| 2019/0097968 A1 | 3/2019 | Inforzato et al. |
| 2019/0364014 A1 | 11/2019 | Endou |
| 2020/0076733 A1 | 3/2020 | Venkataraman |

FOREIGN PATENT DOCUMENTS

| | | |
|---|---|---|
| EP | 3491798 B1 | 7/2020 |
| EP | 2784982 B1 | 8/2020 |
| GB | 2487818 A | 8/2012 |
| GB | 2505288 A | 2/2014 |
| WO | 2019006014 A1 | 1/2019 |

OTHER PUBLICATIONS

Combined Search and Examination Report under Sections 17 & 18(3) issued in United Kingdom Patent Application No. 2212677.5 dated Feb. 14, 2023, 5 pages.
Examination Report under Section 18(3) issued in United Kingdom Patent Application No. 2212677.5 dated Dec. 8, 2023, 6 pages.

CORRELATING PROTOCOL DATA UNITS TRANSITING NETWORKS WITH DIFFERING ADDRESSING SCHEMES

FIELD

This disclosure relates generally to digital network communications.

BACKGROUND

Digital network (hereinafter, "network") communications utilize discrete blocks of information, commonly referred to as "protocol data units." Examples of protocol data units include transport layer (e.g., Transmission Control Protocol (TCP)) segments, network layer (e.g., Internet Protocol (IP)) packets, User Datagram Protocol (UDP) datagrams, and data link layer (e.g., Ethernet or Point-to-Point Protocol (PPP)) frames and cells. Protocol data units are segmented with identifiable fields in which information of specified types may be present.

Network communications rely on addresses for purposes of routing protocol data units. Different networks, and sometimes different portions of the same network, may utilize different address schemes. (As used herein, the term "network" embraces networks and portions thereof.) For example, the Internet Engineering Task Force (IETF) Request for Comment 1918 (RFC 1918), incorporated by reference herein, explains how a private IPv4 addressing scheme may be used within a private network and a public, or "global," addressing scheme may be used outside of the private network. As another example, the IETF Multi-Protocol Label Switching (MPLS) uses an addressing scheme based on labels that is different from addressing schemes based on IP network addresses. Other addressing schemes are in use today.

A network communication session may include a plurality of protocol data units, which may transition between networks that have different addressing schemes. Network communication sessions are generally time delimited, but may range in time scale from momentary, e.g., less than a second, to nearly perpetual, e.g., on the order of months. In general, a network communication session may be two way and/or may involve two or more communicating devices.

Being able to identify and correlate protocol data units of the same communication session is useful in many situations, such as network technical troubleshooting, network optimization, traceback, security monitoring, and forensic analysis or investigations. As communication networks evolve technologies, grow in size, or become topologically complex, being able to correctly and efficiently locate, identify, and correlate protocol data units from the same network communications session becomes more difficult. Existing techniques for accomplishing session correlation of protocol data units, such as are used by network device manufacturers, telecommunications operators, and telecommunications service providers, often require accurate and high-precision timing synchronization between multiple devices or network elements, making these existing techniques expensive, complex, difficult to implement, and difficult to deploy effectively or at scale.

SUMMARY

According to various embodiments, a computer-implemented method of identifying associated communications between a first network with a first addressing scheme and a second network with a second addressing scheme, wherein a network address translator interposed between the first network and the second network translates between the first addressing scheme and the second addressing scheme, is presented. The method includes: detecting a first protocol data unit addressed from a first device in the first network in the first addressing scheme and addressed to a destination in the second network in the second addressing scheme, prior to translation of the first protocol data unit from the first addressing scheme to the second addressing scheme by the network address translator; inserting, prior to translation from the first addressing scheme to the second addressing scheme by the network address translator, a breadcrumb protocol data unit that is addressed to the second network, the breadcrumb protocol data unit comprising, in a location subject to address translation by the network address translator, a source address of the first protocol data unit, the breadcrumb protocol data unit further comprising, in a location immune from address translation by the network address translator, the source address of the first protocol data unit; receiving a translated breadcrumb protocol data unit, wherein the translated breadcrumb data protocol unit comprises the breadcrumb data protocol unit after translation from the first addressing scheme to the second addressing scheme by the network address translator, wherein the translated breadcrumb protocol data unit comprises a translated source address of the first protocol data unit, wherein the translated source address of the first protocol data unit comprises the source address of the first protocol data unit after translation from the first addressing scheme to the second addressing scheme by the network address translator; and reporting an association of the source address of the first protocol data unit with the translated source address of the first protocol data unit.

Various optional features of the above method embodiments include the following. The method may further include performing a network forensic traceback based on the association. The breadcrumb protocol data unit may include a private breadcrumb protocol data unit. The first device may include a network communication endpoint, wherein the network address translator comprises a network address translator (NAT) device at a gateway of the first network, and the detecting the first data protocol unit and the inserting may be performed by a sensor device. The breadcrumb protocol data unit may further include, in a location subject to address translation by the network address translator, a source port of the first protocol data unit, the breadcrumb protocol data unit may further include, in a location immune from address translation by the network address translator, the source port of the first protocol data unit, and the translated breadcrumb protocol data unit may further include a translated source port of the first protocol data unit, where translated source port of the first protocol data unit includes the source port of the first protocol data unit after translation from the first addressing scheme to the second addressing scheme by the network address translator, and the method may further include reporting an association of the source port of the first protocol data unit with the translated source port of the first protocol data unit. The reporting may include logging in persistent storage. One of the first addressing scheme or the second addressing scheme may include addressing for a private internet protocol address space, and another of the first addressing scheme or the second addressing scheme may include addressing for a global internet protocol address space. The first protocol data unit and the breadcrumb protocol data unit may include network layer packets. The first protocol data unit and the breadcrumb protocol data unit may include data link layer frames. One of the source address or the translated source address may include a multi-protocol label switching (MPLS) label. The breadcrumb protocol data unit may include data representing a predetermined time to live. The first protocol data unit may be part of a communication session, and the inserting may occur a predetermined number of times during the communication session. The method may further include generating the breadcrumb protocol data unit. The detecting and the inserting may be performed by the first device.

According to various embodiments, a computer system for identifying associated communications between a first network with a first addressing scheme and a second network with a second addressing scheme, wherein a network address translator interposed between the first network and the second network translates between the first addressing scheme and the second addressing scheme, is presented. The system includes: a first sensor communicatively coupled to a first device in the first network to detect a first protocol data unit addressed from a first device in the first network in the first addressing scheme and addressed to a destination in the second network in the second addressing scheme, prior to translation of the first protocol data unit from the first addressing scheme to the second addressing scheme by the network address translator, wherein the first sensor is configured to insert, prior to translation from the first addressing scheme to the second addressing scheme by the network address translator, a breadcrumb protocol data unit that is addressed to the second network, the breadcrumb protocol data unit comprising, in a location subject to address translation by the network address translator, a source address of the first protocol data unit, the breadcrumb protocol data unit further comprising, in a location immune from address translation by the network address translator, the source address of the first protocol data unit; and a second sensor communicatively coupled to the network address translator to receive a translated breadcrumb protocol data unit, wherein the translated breadcrumb data protocol unit comprises the breadcrumb data protocol unit after translation from the first addressing scheme to the second addressing scheme by the network address translator, wherein the translated breadcrumb protocol data unit comprises a translated source address of the first protocol data unit, wherein the translated source address of the first protocol data unit comprises the source address of the first protocol data unit after translation from the first addressing scheme to the second addressing scheme by the network address translator, wherein the computer system is configured to report an association of the source address of the first protocol data unit with the translated source address of the first protocol data unit.

Various optional features of the above computer system embodiments include the following. The computer system may be further configured to perform a network forensic traceback based on the association. The breadcrumb protocol data unit may include a private breadcrumb protocol data unit. The first device may include a network communication endpoint, and the network address translator may include a network address translator (NAT) device at a gateway of the first network. The breadcrumb protocol data unit may further include, in a location subject to address translation by the network address translator, a source port of the first protocol data unit, the breadcrumb protocol data unit may further include, in a location immune from address translation by the network address translator, the source port of the first protocol data unit, and the translated breadcrumb protocol data unit may further include a translated source port of the first protocol data unit, where the translated source port of the first protocol data unit includes the source port of the first protocol data unit after translation from the first addressing scheme to the second addressing scheme by the network address translator, and the computer system may be further configured to report an association of the source port of the first protocol data unit with the translated source port of the first protocol data unit. The computer system may include persistent storage, and the computer system may report the association by logging the association in the persistent storage. One of the first addressing scheme or the second addressing scheme may include addressing for a private internet protocol address space, and another of the first addressing scheme or the second addressing scheme may include addressing for a global internet protocol address space. The first protocol data unit and the breadcrumb protocol data unit may include network layer packets. The first protocol data unit and the breadcrumb protocol data unit may include data link layer frames. One of the source address or the translated source address may include a multi-protocol label switching (MPLS) label. The breadcrumb protocol data unit may include data representing a predetermined time to live. The first protocol data unit may be part of a communication session, and the first sensor may be configured to insert a breadcrumb protocol data unit a predetermined number of times during the communication session. The first sensor may be configured to generate the breadcrumb protocol data unit. The first sensor may be in the first device.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
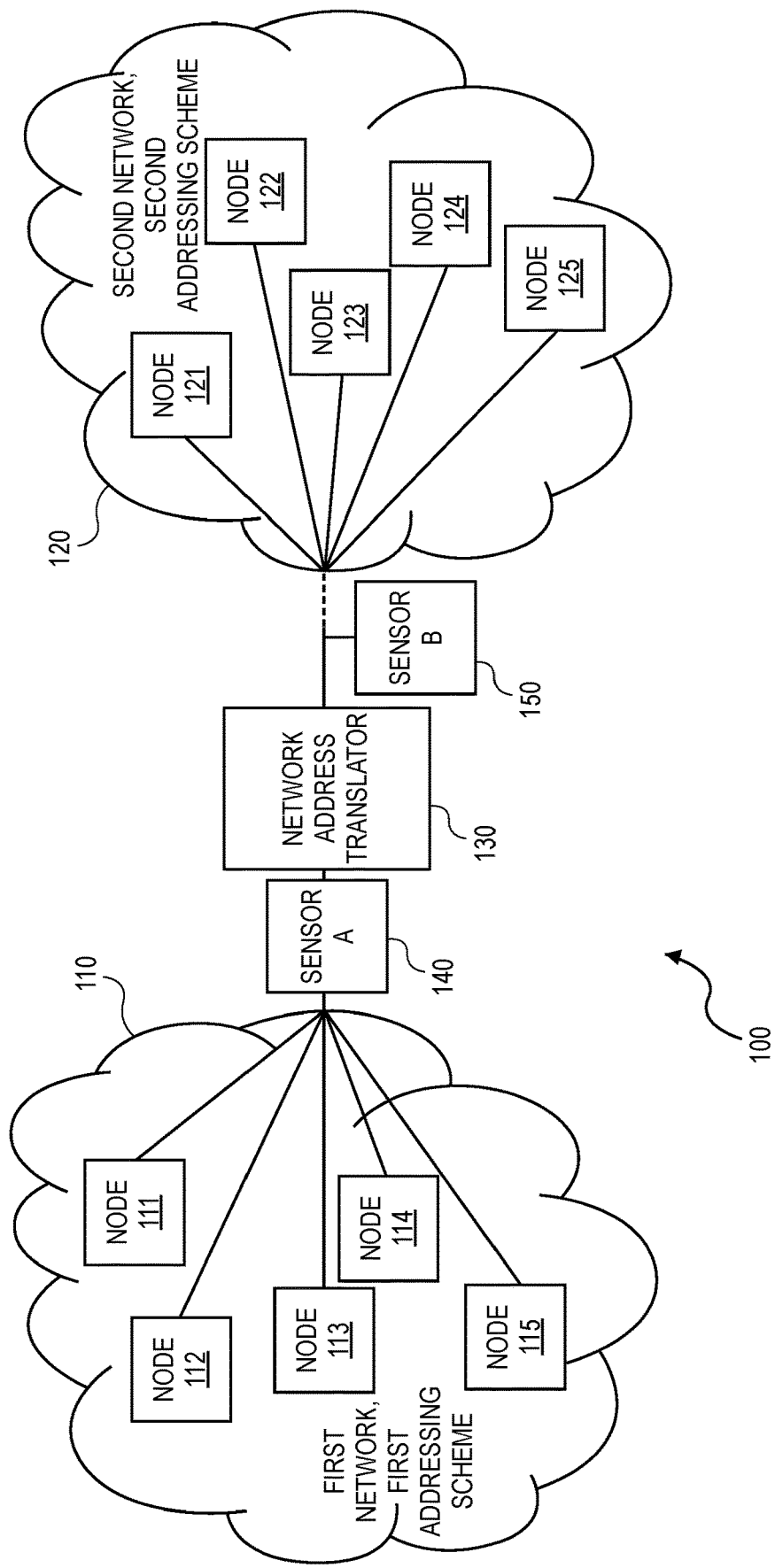
FIG. 1 is a schematic diagram of a system for identifying associated communications between a first network with a first addressing scheme and a second network with a second addressing scheme, according to various embodiments.

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments correlate protocol data unit addresses for a network communications session as the protocol data units traverse networks with differing address schemes. Embodiments may be utilized to correlate address associations among any of a variety of differing addressing schemes, such as between any of TCP/IPv4, TCP/IPv6, and Multi-Purpose label Switching (MPLS), among others.

Some embodiments report correlations of address associations upon creation, termination, or expiration of communication sessions, or periodically (e.g., continuously) throughout the lifetime of the communication sessions. Reporting may be accomplished via logging, exporting, alerting, or other mechanisms or techniques.

Some embodiments accomplish these correlation and reporting tasks or functions across a wide variety of communications networks having multiple varying underlying technology characteristics, such as different addressing schemes, speeds, and topologies, without requiring network topology changes or the added complexity of, and reliance upon, high-precision time synchronization or out-of-band communications.

Some embodiments inexpensively and accurately determine the endpoints involved in a network communication session, even as protocol data units of the session cross boundaries between multiple different addressing schemes.

Some embodiments provide accurate historical records of address correlations, even when such correlations and/or the underlying network technologies and addressing schemes change over time.

Some embodiments track and report address correlations upon creation, termination, or expiration of a communication session, or periodically (e.g., continuously) throughout its lifetime.

Some embodiments operate in an efficient, asynchronous, and seamless manner that does not interrupt or otherwise adversely affect the operation of the networks, their speed, or their qualities of service.

Some embodiments achieve one or more of the above features and advantages through the use of a novel specially crafted protocol data unit, referred to as a breadcrumb protocol data unit. Some embodiments introduce the breadcrumb protocol data unit into an originating network with a first addressing scheme, detect the breadcrumb protocol data unit after it transits a network translation device that translates into a second addressing scheme of a destination network, and then extract the desired information from the translated breadcrumb protocol data unit. The information can then be used for any of a variety of network operations. According to some embodiments, the breadcrumb protocol data unit is a private protocol data unit in the sense that it does not reach the destination address in the destination network.

These and other features and advantages are described in detail in reference to the figures presently.

FIG. 1 is a schematic diagram of a system 100 for identifying associated communications between a first network 110 with a first addressing scheme and a second network 120 with a second addressing scheme, according to various embodiments. The networks 110, 120 may be, by way of non-limiting examples, any, or any combination, of enterprise networks, intranets, Local Area Networks (LANs), Wide Area Networks (WANs), and wireless networks, such as by way of non-liming example, General Packet Radio Service (GPRS) networks. As shown in the example of FIG. 1, each network 110, 120 includes a plurality of nodes. The first network 110 includes nodes 111, 112, 113, 114, and 115. The second network 120 includes nodes 121, 122, 123, 124, and 125. Each node may be a network communication endpoint such as, by way of non-limiting examples, a personal computer, a mainframe computer, a client computer, a server computer, a cellular telephone, an Internet of Things (IoT) appliance, a computerized device, etc. According to various embodiments, each network 110, 120 may include more or fewer nodes.

The first network 110 uses a first addressing scheme, by way of non-limiting example, a private IPv4 addressing scheme, a public or global IPv4 addressing scheme, an IPv6 addressing scheme, a MPLS addressing scheme, etc. Accordingly, the first network 110 includes a network address translator 130, which may be at a gateway. Such a network address translator 130 may be a Network Address Translation (NAT) device, for example.

The second network 120 uses an addressing scheme different from that of the first network 110, e.g., per any of the preceding examples. Accordingly, the second network 120 may include a network address translator (not shown), which may be at a gateway of the second network 120.

Lines between elements shown in FIG. 1 indicate network communicative couplings; however, those shown are non-limiting examples. Additional or fewer communicative couplings may be present in various embodiments. In particular, although the first network 110 is shown as being communicatively coupled to the second network 120 by way of the sensor A 140, the network address translator 130, and the sensor B 150, additional devices and networks may be interposed between the first network 110 and the second network 120 along the communicative coupling shown in FIG. 1. Further, such an interposed network may include an addressing scheme different from those of either the first network 110 or the second network 120.

The system 100 for identifying associated communications between the first network 110 with the first addressing scheme and the second network 120 with the second addressing scheme includes sensors 140, 150 in the example of FIG. 1. The sensors 140, 150 are communicatively situated on either side of the network address translator 130, which may be part of the first network 110. By way of non-limiting example, the sensor A 140 is shown as being communicatively in-line between the gateway of the first network 110 and the network address translator 130 so as to be able to both pass protocol data units through and insert one or more novel breadcrumb protocol data units, which may be private breadcrumb protocol data units, into the communication channel as disclosed herein. By way of non-limiting example, the sensor B 150 is shown in a lollipop configuration from the communicative coupling on the other side of the network address translator 130, so as to be able to read from, and write protocol data units to, the communication channel. However, according to various embodiments, either sensor 140, 150 may be configured in-line (as shown for sensor A 140), in a lollipop topology (as shown for sensor B 150), or any other communicative coupling that permits the communications and functions described herein. For example, according to some embodiments, the sensor A 140 may be implemented in one or more nodes 111, 112, 113, 114, and 115, and may detect protocol data units generated by such nodes and insert breadcrumb protocol data units into the communicative outputs of such nodes. In general, according to various embodiments, the sensors 140, 150 may be implemented in appropriately programmed general purpose computers (e.g., nodes, servers or the like), in specialized computerized devices (e.g., network appliances or the like), or in dedicated hardware devices that perform the processes, functions, and operations described herein, and the sensors 140, 150 may be separate from the network address translator 130. According to other some embodiments, the sensors 140, 150 are implemented using the network address translator 130, e.g., by appropriate software.

The sensors 140, 150 operate together (without any required synchronization) to identify new and existing sessions by inserting identifying information, (e.g., the original source address information used by the first addressing scheme of the first network 110) into a specialized breadcrumb protocol data unit(s) and using it to detect how the network address translator 130 changes addressing schemes. For example, the sensor 140 that is upstream of the network address translator 130 may insert identifying information into a novel breadcrumb protocol data unit and send that breadcrumb protocol data unit to the network address translator 130. The breadcrumb protocol data unit uses the same destination address as ordinary protocol data units from the detected session, allowing it to take the same path and pass through the network address translator 130 in the same way. The network address translator 130 performs the address translation on the breadcrumb protocol data unit, just as it performs the address translation on the ordinary message protocol data units of the session. After the translated ordinary session protocol data units and the translated private protocol data unit pass through the network address translator 130, the sensor B 150, having access to the traffic on the downstream side of the network address translator 130, detects the breadcrumb protocol data unit and uses information contained therein to correlate the addresses of the translated session protocol data units. According to various embodiments, sensor B 130 records and/or reports this correlation, e.g., by storing, in association, the originating address and port in the addressing scheme of the first network 110, the translated originating address and port, as translated into the addressing scheme of the second network 120, and the respective protocol.

For example, the first network 110 may utilize private IPv4 addresses for its addressing scheme, and the second network 120 may utilize public IPv4 addresses for its addressing scheme. In this example, the sensor B 150 may report, e.g., log in a manner that is accessible by other devices, correlation information in the form of (private_source_IP_address, private_source_port, public_source_IP_address, public_source_port, protocol).

As another example, one of the first network 110 and the second network 120 may utilize an MPLS addressing scheme, and the other of the first network 110 and the second network 120 may utilize an IPv4 addressing scheme. In this example, the sensor B 150 may report a correlation between an MPLS label and an IPv4 address. The report may include logging, in a manner that is accessible by other devices, correlation information in the form of (MPLS label, IPv4_IP_address, IPv4_port, protocol).

In general, system 100 may be used to identify and report address correlations in network communication session protocol data units in any case where there is a network device or appliance making changes to the addressing scheme being used as the protocol data units pass through (e.g., the network address translator 130).

Sensor B 150 can report the correlations in any of a variety of ways. For example, some embodiments may report the correlations by storing them in persistent storage, e.g., in persistent memory or in a local or remote database, and the persistent storage may be accessible (e.g., readable) by other devices, such as a network administrator's computer or the like (not shown in FIG. 1). According to some embodiments, reporting may include such storage, and/or sending an alert, e.g., by way of email or text message. Such an alert may be sent when a pre-specified condition is triggered, e.g., a session involving (e.g., originating from or sent to) a particular address in any addressing scheme, or a session that includes protocol data units that have a specified correlation of addresses from multiple addressing schemes.

Although the example of FIG. 1 depicts the first network 110 as having a single egress route and the second network 120 as having a single ingress route, embodiments are not so limited. In general, embodiments may be used for networks with any number of ingress and egress routes. For example, embodiments may include pairs of sensors, such as are described in reference to sensor A 140 and sensor B 150, at each ingress and egress route of a network that utilizes a network address translator (e.g., such as the network address translator 130).

Although the example of FIG. 1 depicts the first network 110 as using a network address translator 130 and sensors 140 and 150, the second network 120 can include its own network translator and use its own sensors. Accordingly, the second network 120 may detect and report correlation information with respect to its own network address translator in the same manner as described herein with respect to the first network 110.

Although FIG. 1 depicts sensor A 130 and sensor B 140 as being implemented in separate physical devices, embodiments are not so limited. According to some embodiments, both sensors 130, 140 are implemented using distinct logical functions in the same physical device. For example, according to some embodiments, the physical network connections can use the same hardware device, e.g., the network translation device 150, but sensor A 130 software executes on one physical port and sensor B 140 software executes on another physical port. In general, sensor A 130 and sensor B 140 may be implemented in locations ranging from the same physical device to separate physical devices separated by a great distance.

Figure 2:
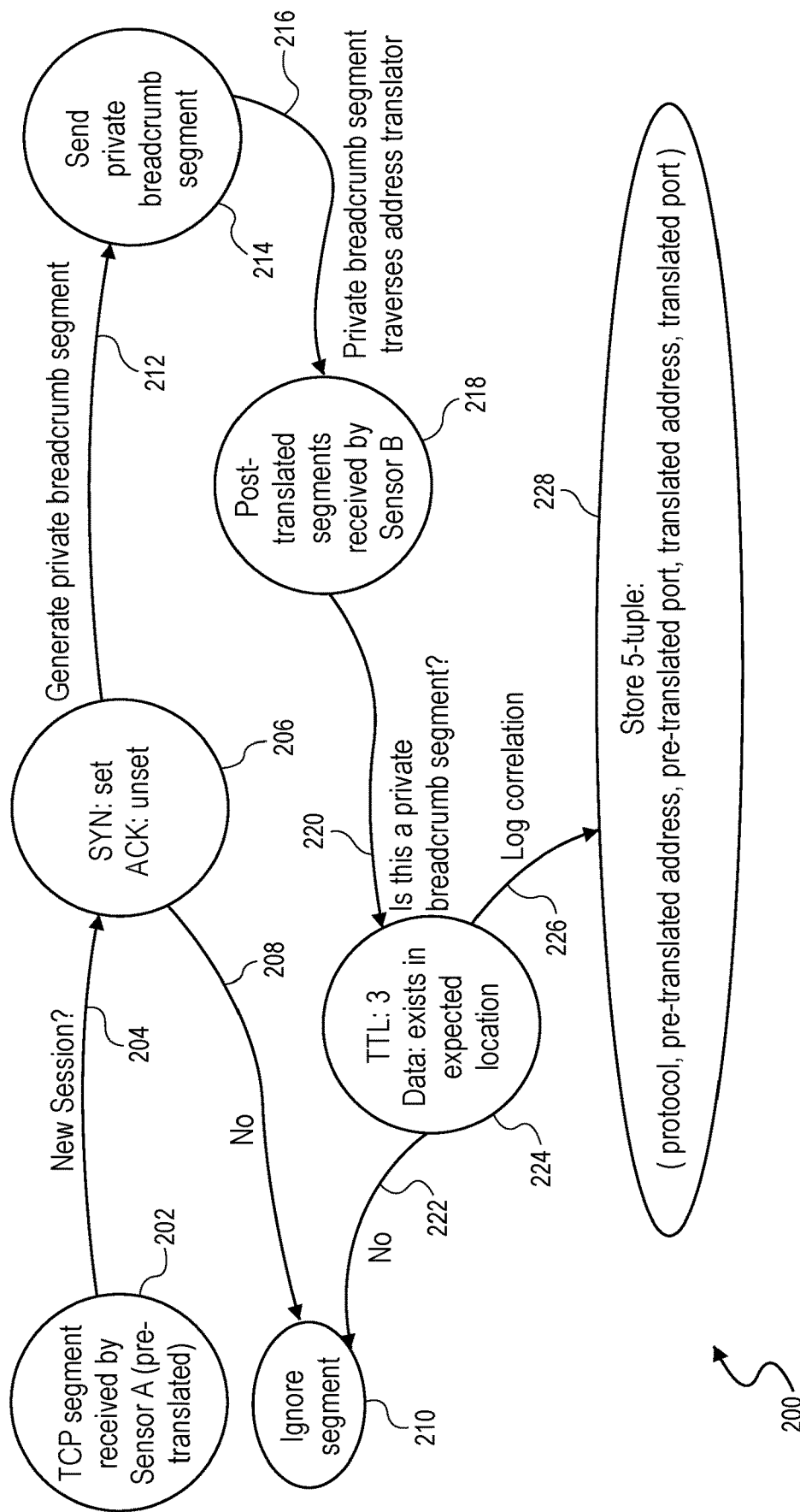
FIG. 2 is a state diagram for a method of identifying associated communications between a first network with a first addressing scheme and a second network with a second addressing scheme, according to various embodiments.

FIG. 2 is a state diagram for a method 200 of identifying associated communications between a first network with a first addressing scheme and a second network with a second addressing scheme, according to various embodiments. Method 200 may be performed by a system such as system 100 as shown and described herein in reference to FIG. 1. By way of non-limiting example, method 200 is described in reference to TCP segments; however, method 200 may be used for any protocol data unit in any layer or otherwise as described herein.

At 202, a TCP segment is received by a first sensor A at a network gateway, e.g., the sensor A 140 of system 100, prior to translation by a network address translator, e.g., the network address translator 130 of FIG. 1. At 204, method 200 proceeds to determine whether the segment is part of a new session. For the non-limiting example of TCP, this can be done by detecting the initiation of a TCP SYN-ACK handshake. Thus, as represented at 206, if the received segment includes a set SYN field and an unset ACK field, it indicates the initiation of a new session. If a new session is not detected as represented by 208 (e.g., SYN is unset and/or ACK is set), then the segment is ignored per 210. Otherwise, if a new session is detected at 206, then the first sensor creates or generates a breadcrumb protocol data unit, which in the present non-limiting example, is a private breadcrumb segment at 212. In various embodiments, the private breadcrumb segment is generated based on, or using, information from the new-session TCP segment that was received at 202 and detected at 204, 206.

For example, the private breadcrumb segment may be generated to include the same source address and port as the detected new-session segment in its respective source address and source port fields. Such information in these fields is subject to translation by the network address translator.

The newly created private breadcrumb segment also includes, in one or more fields that are immune from alteration (i.e., fields holding data that will not be changed) by the network address translator, source-identifying information that is detectable by a corresponding second sensor, e.g., the sensor B 150 of system 100, on the other side of the network address translator. Specifically, such identifying information can include the original, untranslated source address and source port number. Example fields that are immune from alteration by the network address translator include, by way of non-limiting example, IP options, TCP options, and data payload fields.

The new private breadcrumb segment also includes data that indicates that it is a breadcrumb segment, as opposed to a segment that is part of the original communication session. By way of non-limiting example, in some embodiments, the first, upstream sensor A 140 may set the data in an ordinary field of the private breadcrumb protocol data unit to a specific value that will be recognized by the second, downstream sensor B 150—for instance, the time to live (TTL) field of a TCP private breadcrumb segment can be set to a low fixed predetermined number, e.g., 2, 3, 4, 5, 6, etc. Selecting a low number can ensure that that the private breadcrumb segment does not survive past, or more than a few nodes past, the downstream sensor B 150 into the destination network or an intermediate network. Thus, the private breadcrumb segment is private in the sense that it does not transition deep into, or into at all, the destination network or any intermediate network, and does not arrive at the destination device. In a non-limiting example, the TTL may be set to three. In another example of setting the data in an ordinary field of the protocol data unit to a specific value to identify it as a breadcrumb protocol data unit, the upstream sensor A 140 may write any specific data, such as the binary number 1010101010101 into the IP options field, assuming it is not being used for another purpose. Similarly, the TCP options field could be used, among others.

At 214, the first sensor inserts the newly created private breadcrumb segment into the communication channel. For example, the first sensor A 140 may send or transmit the new private breadcrumb segment to the network address translator 130. At 216, the private breadcrumb segment traverses the network address translator. The network address translator processes the private breadcrumb segment in the same way as for any other TCP segment that it receives. Among other things, the network address translator translates the private breadcrumb segment, (e.g., from the first addressing scheme used by the first network 110 into the second addressing scheme used by the second network 120), by replacing the source address in the source address field and source port number in the source port number field with translated versions. The network address translator leaves unchanged the data in the field(s) of the private breadcrumb segment that is/are immune from network address translation and any other changes by the network address translator.

At 218, the translated private breadcrumb segment is received by the second, downstream sensor (e.g., sensor B 150) on the other side of the network address translator. At 220, the second downstream sensor B proceeds to determine whether the received segment is a private breadcrumb segment. In this example, the second sensor does so by checking the value in the TTL field at 224. If it detects a value other than three, in this non-limiting example, then the system ignores the segment at 210. Otherwise, if it detects a value of three, in this non-limiting example, then the second sensor processes the received segment as a private breadcrumb segment. For example, the second sensor may extract the original, untranslated source address and port number information and the translated source address and port number information from the received segment, and may report the correlation of the original source address and port number with the translated source address and port number at 226. By way of non-limiting example, the second sensor may report the correlation by logging or storing in local persistent storage the five-tuple (protocol, pre-translated_source_address, pre-translated_port, translated_address, translated_port). In this example, the protocol in the five-tuple is TCP. According to some embodiments, the report may further include the destination network protocol.

Because the TTL of the private breadcrumb segment (in this example) is set to three, the private breadcrumb segment is not passed deeply into any intermediate network or the destination network downstream of the second sensor B. Accordingly, at the destination, the communication session segments appear as they would without the presence of the private breadcrumb packet. Further, the private breadcrumb segments are not detected at the destination and thus remain private.

Although method 200 is described in reference to a single private breadcrumb segment, embodiments are not so limited. In general, embodiments may inject and detect private breadcrumb protocol data units into the communication channel at any of a variety of times and in any of a variety of frequencies. According to some embodiments, a fixed predetermined number (e.g., one, eight, sixteen, etc.) of private breadcrumb protocol data units are inserted and detected for each detected network communication session. According to some embodiments, one or more, e.g., a predetermined number of, private breadcrumb protocol data units are sent at the beginning, end, and/or intermediate part of each detected network communication session. According to some embodiments, private breadcrumb protocol data units are sent periodically throughout each detected network communication session. For example, private breadcrumb protocol data units may be sent periodically with respect to time (e.g., every millisecond, every second, etc.) or with respect to session protocol data units (e.g., after every one, eight, sixteen, etc. session protocol data units).

Method 200 is described in reference to the system 100 of FIG. 1, in which a network address translator 130 and sensors 140 and 150 are situated with respect to the first network 110. However, a corresponding method 200 may be performed with respect to the second network 120 if the second network 120 includes its own network address translator and uses sensors as described herein with respect to the first network 110. Further, the second network 120 may detect and report correlation information with respect to its own network address translator. Yet further, the correlation information for the second network 120 may be combined with the correlation information for the first network 110, e.g., by conveying the correlation information for the second network 120 to be stored with correlation information for the first network 110. Such combined correlation information may be stored at either of the first network 110 or the second network 120, or may be stored remote from the first network 110 and the second network 120.

In the following, and in reference to FIGS. 3-10, example configurations of private breadcrumb data protocol units, specifically private breadcrumb packets and private breadcrumb segments, are presented in detail, by way of non-limiting examples.

Figure 3:
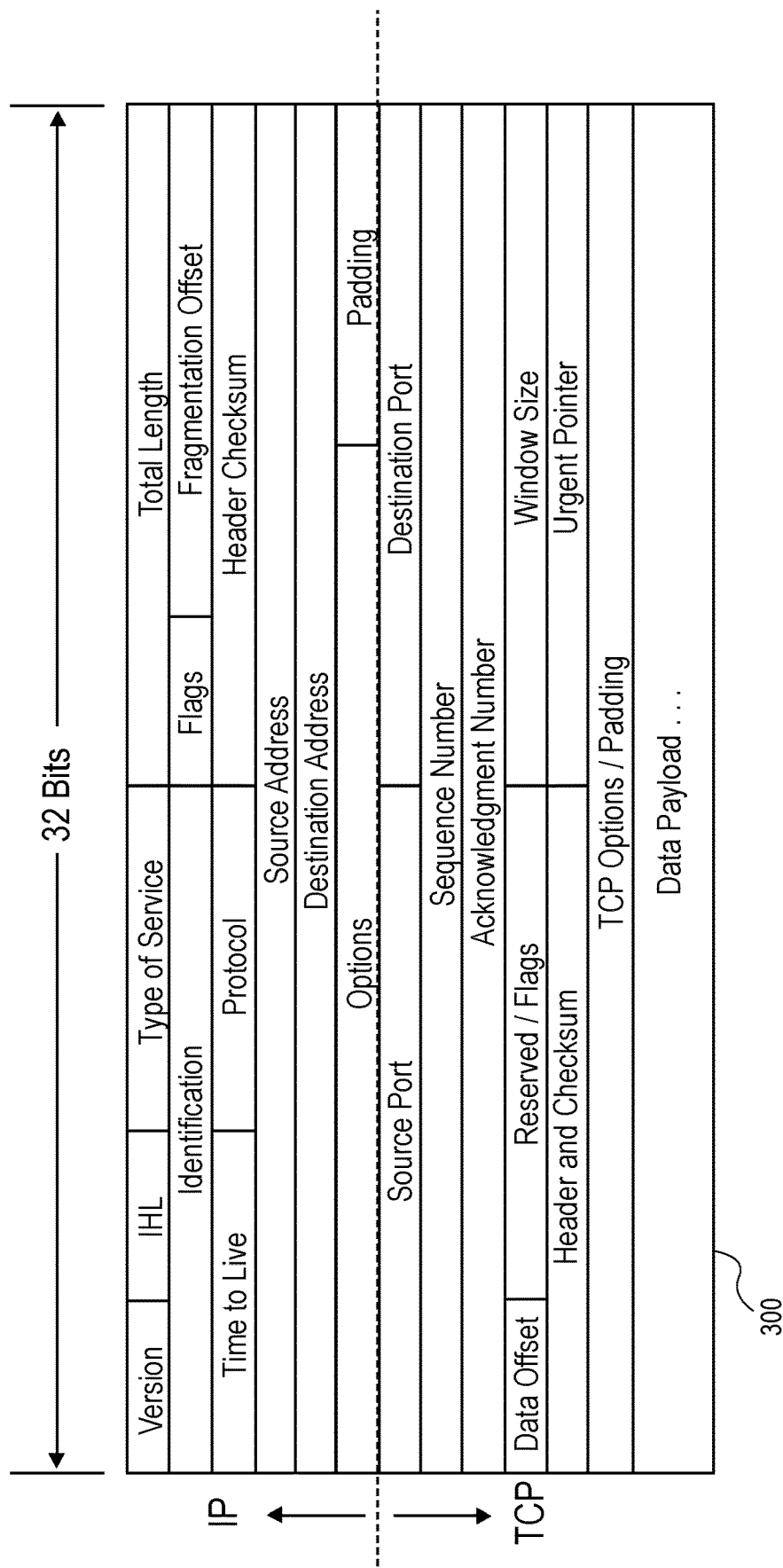
FIG. 3 is a TCP/IP packet diagram.

FIG. 3 is a TCP/IP packet diagram 300. In particular, the packet diagram depicts fields for TTL, protocol, IP source address, IP destination address, source port, destination port, IP options, TCP options, and data payload, among other things. As explained above, the values in the IP source address and the source port fields are subject to address translation by a network address translator (e.g., the network address translator 130). Values in the IP destination address, destination port, IP options, TCP options, and data payload fields are immune from address translation and not subject to any changes by a network address translator.

Figure 4:
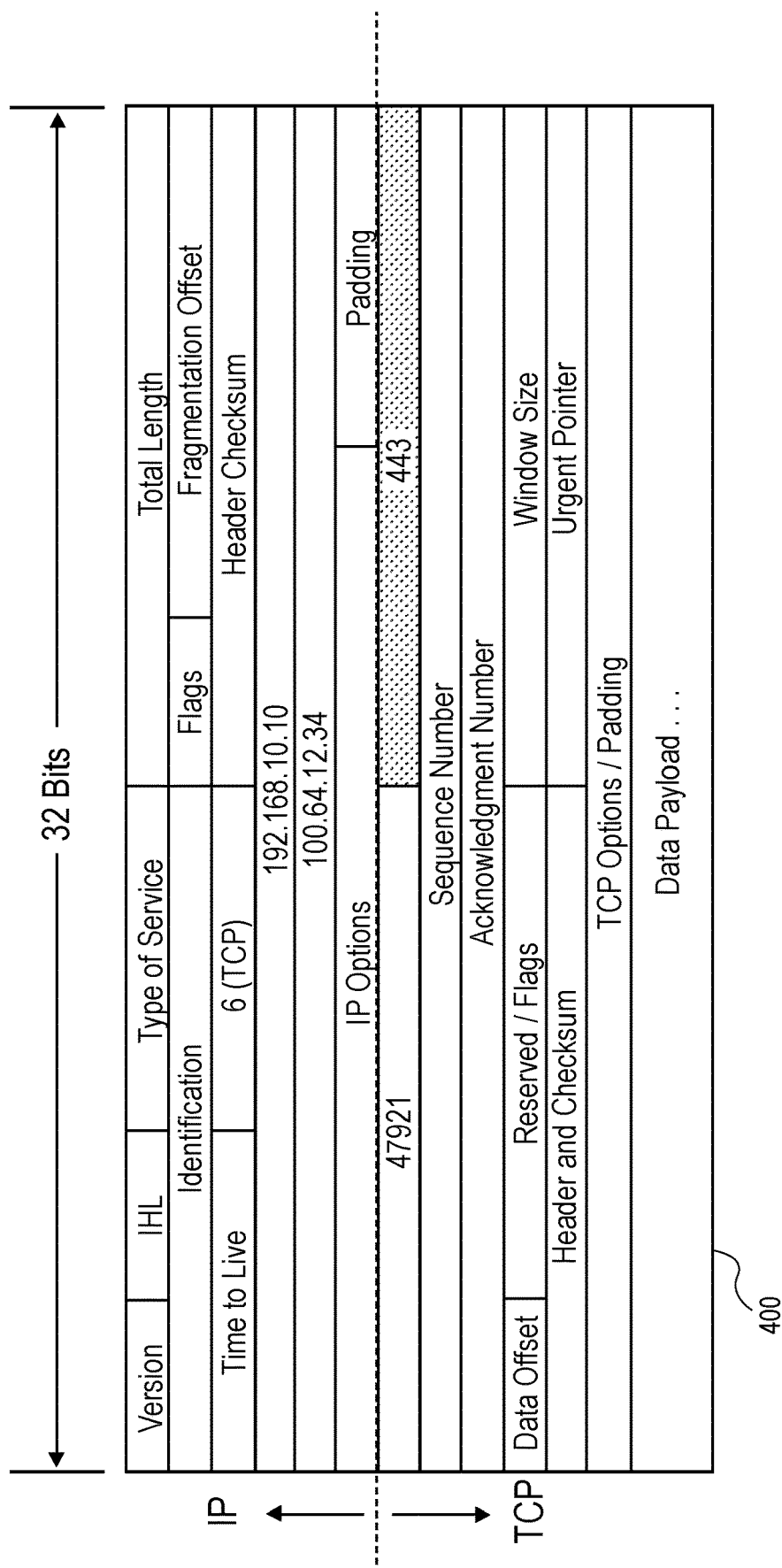
FIG. 4 is an example pre-translation TCP/IPv4 message packet diagram.

FIG. 4 is an example pre-translation TCP/IPv4 message packet diagram 400. The message packet 400 represented by the diagram may be part of a communication session, and the message packet 400 is shown before being received and processed by the network address translator 130, according to various embodiments. In particular, various embodiments are described in reference to FIGS. 4-10 in which a packet as depicted by the diagram 400 appears in the communication session and is detected by a first sensor, e.g., the sensor A 140 of system 100, that is upstream of the network address translator 130. Note that, as shown in the diagram 400, the packet includes a value of 6 in its protocol field, indicating TCP. The packet also includes a value of 192.168.10.10 in its IP source address field. The packet further includes a value of 100.64.12.34 in its IP destination address field. The packet further includes a value of 47921 in its source port field. The packet further includes a value of 443 in its destination port field. In various implementations, the information in the IP source address field, the IP destination address field, the source port field, and the destination port field may be in the format of, or otherwise correspond to, the first addressing scheme of the first network 110, as described herein.

Figure 5:
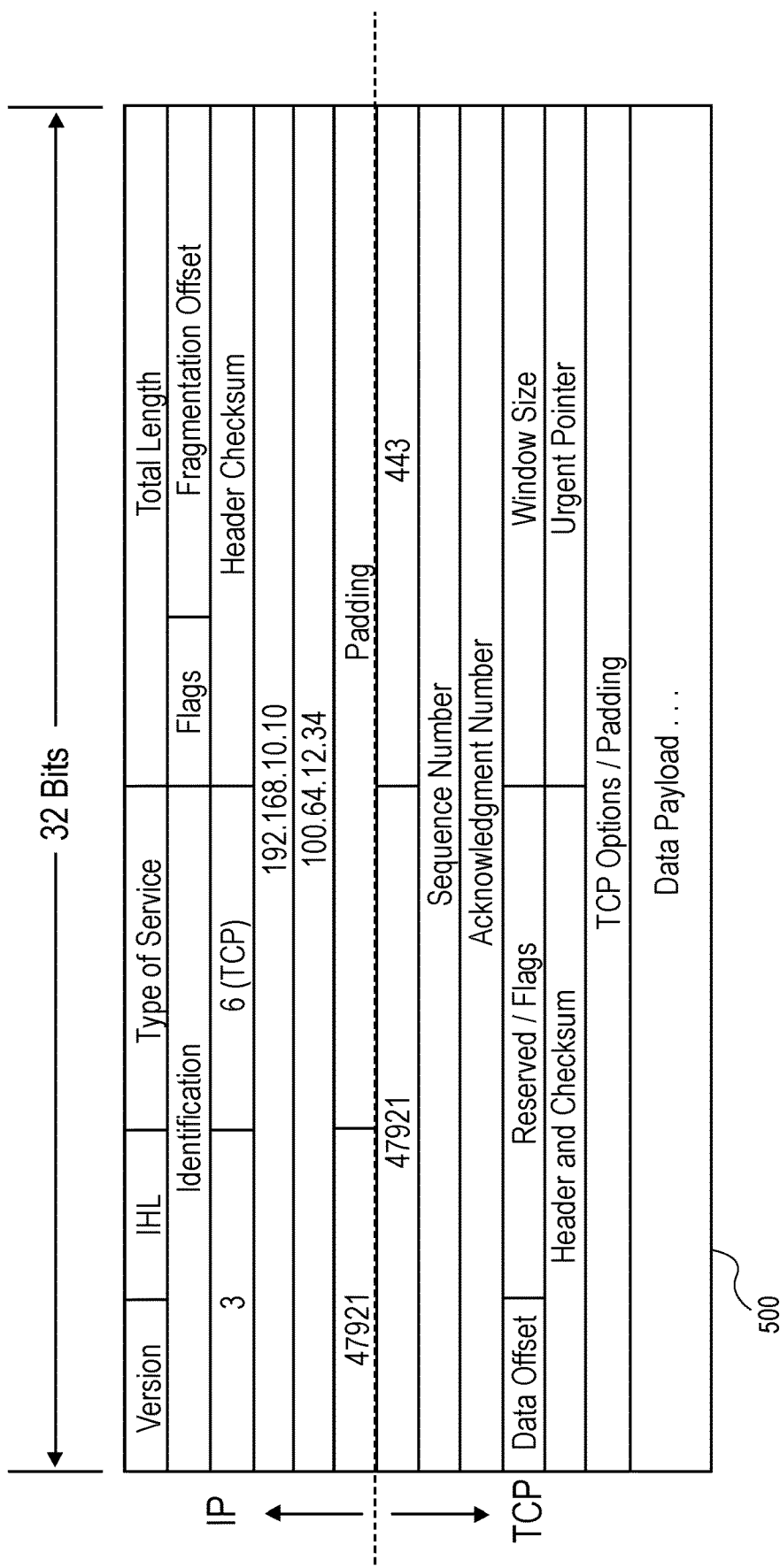
FIG. 5 is an example TCP/IPv4 packet diagram for a pre-translation private breadcrumb packet that uses the IP options field to hold identifying information, according to various embodiments.

FIG. 5 is an example TCP/IPv4 packet diagram 500 for a pre-translation private breadcrumb packet (e.g., one possible implementation of a private breadcrumb protocol data unit) that uses the IP options field to hold identifying information, according to various embodiments. The private breadcrumb packet 500 may be created or generated by a first sensor, e.g., the sensor A 140 of system 100, positioned between the originating network and a network address translator. In particular, the private breadcrumb packet 500 may be generated based on or using values from one or more fields of a detected session packet, in the present example, the session message packet 400 as shown and described in reference to FIG. 4. In various embodiments, the private breadcrumb packet 500 is generated to include the same values in its IP source address, IP destination address, source port, and destination port fields as the values found in the corresponding fields of the session message packet 400, namely, 192.168.10.10, 100.64.12.34, 47921, and 443, respectively. In addition, this example of a private breadcrumb packet 500 includes in its IP options field copies of the IP source address (192.168.10.10 as illustrated in a new row in FIG. 5) and source port number (47921) from the session message packet 400. Although the network address translator 130 may change or translate the values in the IP source address and source port fields into different values, e.g., replace them with different address values that are used by the second address scheme of the second network 120, the original values of the IP source address and source port numbers from the session message packet, which are stored in the IP options field, are immune from translation and will not be changed by the network address translator. The values in the IP options field will therefore pass unaltered through network address translator 130. In this example as shown in FIG. 5, the private breadcrumb packet 500 is given a TTL value of three, which will be detected by a second downstream sensor (e.g., sensor B 150), allowing the second downstream sensor to identify and process the packet 500 as a private breadcrumb packet, which may include preventing the private breadcrumb packet 500 from being transmitted past the second downstream sensor and into the destination network.

Figure 6:
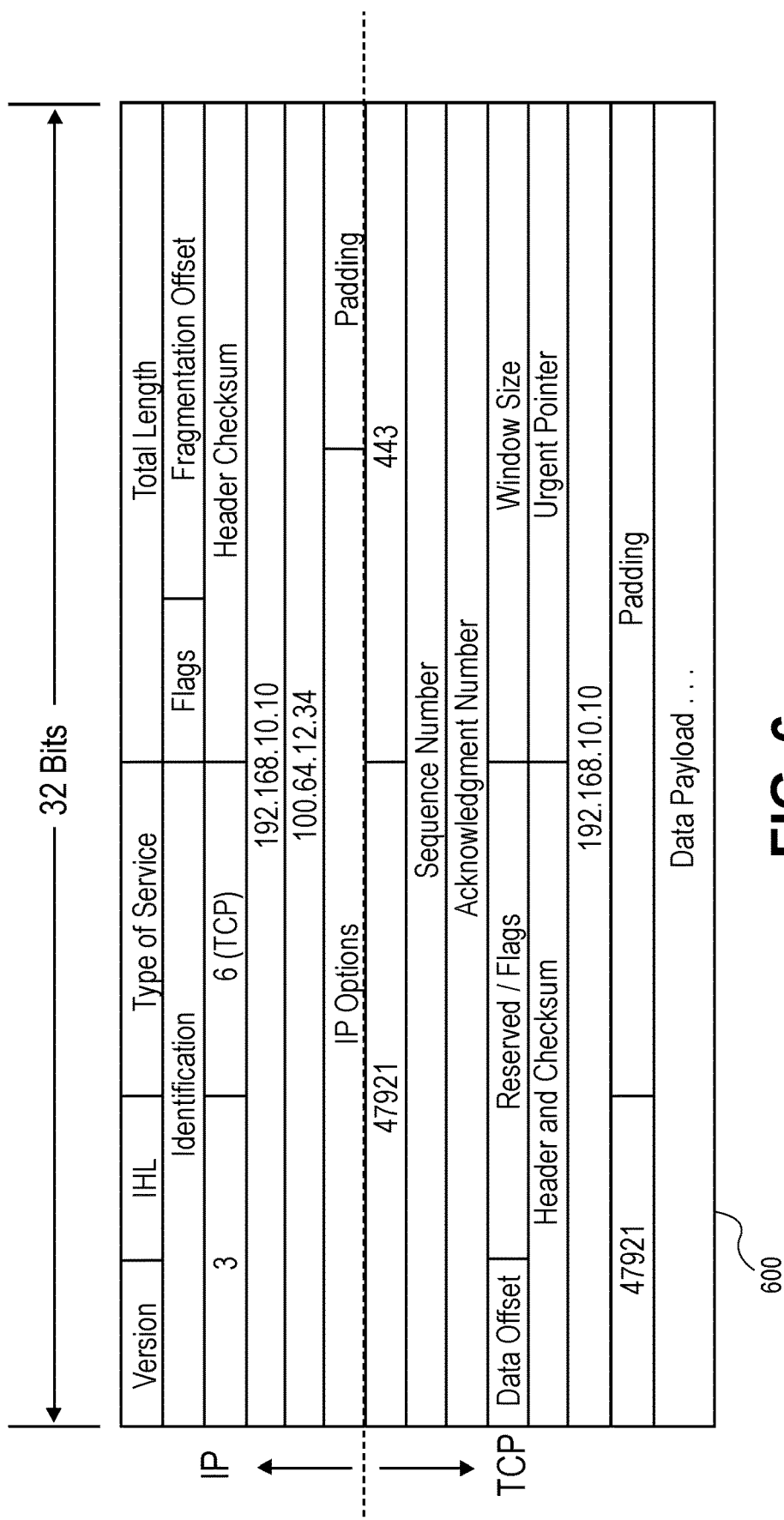
FIG. 6 is an example TCP/IPv4 packet diagram for a pre-translation private breadcrumb packet that uses the TCP options field to hold identifying information, according to various embodiments.

FIG. 6 is an example TCP/IPv4 packet diagram 600 for a pre-translation private breadcrumb packet that uses the TCP options field to hold identifying information, according to various embodiments. The packet represents an alternate private breadcrumb packet to the private breadcrumb packet represented by the diagram 500 shown in FIG. 5. Thus, like the private breadcrumb packet represented by the diagram 500 of FIG. 5, the packet represented by the diagram 600 is generated by a first sensor (e.g., sensor A 140) based on values in fields of the detected session message packet 400 as shown and described in reference to FIG. 4. Accordingly, the private breadcrumb packet represented by the diagram 600 includes the same values in its IP source address, IP destination address, source port, and destination port fields as are present in the corresponding fields of the session message packet 400, namely, 192.168.10.10, 100.64.12.34, 47921, and 443, respectively. Further, the private breadcrumb packet depicted by diagram 600 includes in the TCP options field, which is immune from address translation, copies of the IP source address and source port number from the session message packet. Also, the private breadcrumb packet depicted by the diagram 600 includes a TTL value of three, which will identify it as a private breadcrumb protocol data unit to a downstream sensor (e.g., 150).

Figure 7:
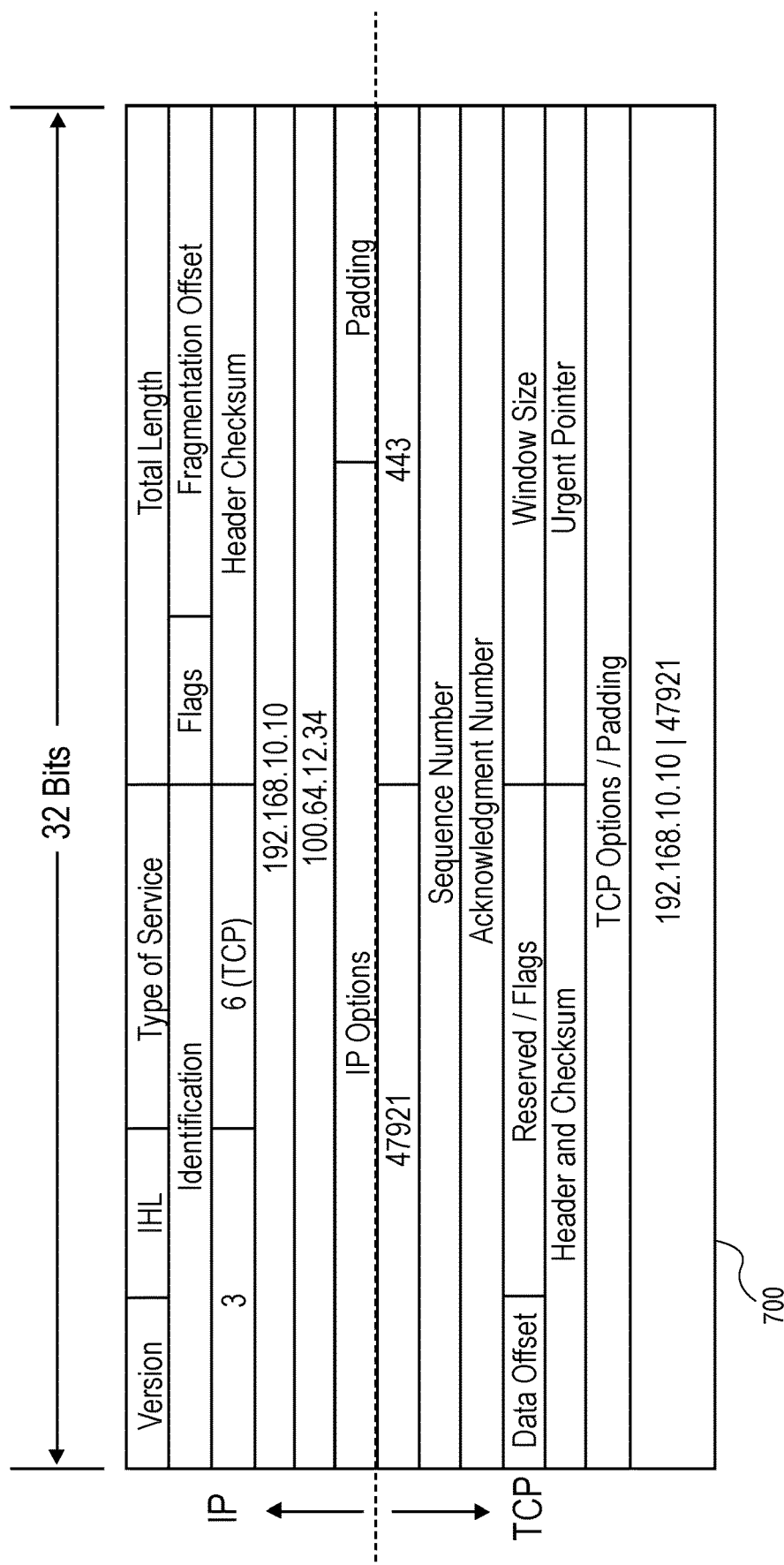
FIG. 7 is an example TCP/IPv4 packet diagram for a pre-translation private breadcrumb packet that uses the data payload field to hold identifying information, according to various embodiments.

FIG. 7 is an example TCP/IPv4 packet diagram 700 for a pre-translation private breadcrumb packet that uses the data payload field to hold identifying information, according to various embodiments. The packet represents an alternate private breadcrumb packet to the private breadcrumb packets represented by the diagram 500 shown in FIG. 5 and the diagram 600 as shown in FIG. 6. The packet represented by the diagram 700 is generated by a first sensor (e.g., sensor A 140) based on the values in the fields of the detected session message packet 400 as shown and described in reference to FIG. 4. The private breadcrumb packet represented by the diagram 700 includes the same values in its IP source address, IP destination address, source port, and destination port fields as are present in the corresponding fields of the session message packet, namely, 192.168.10.10, 100.64.12.34, 47921, and 443, respectively. Further, the private breadcrumb packet depicted by diagram 700 includes in the data payload field, which is immune from address translation, copies of the IP source address and source port number from the session message packet 400, (e.g., representing the source address and source port according to the first addressing scheme of the first network 110). Also, the private breadcrumb packet depicted by the diagram 700 includes a TTL value of three, which signals to a downstream sensor (e.g., sensor B 150) that the private breadcrumb packet is a private breadcrumb protocol data unit.

Figure 8:
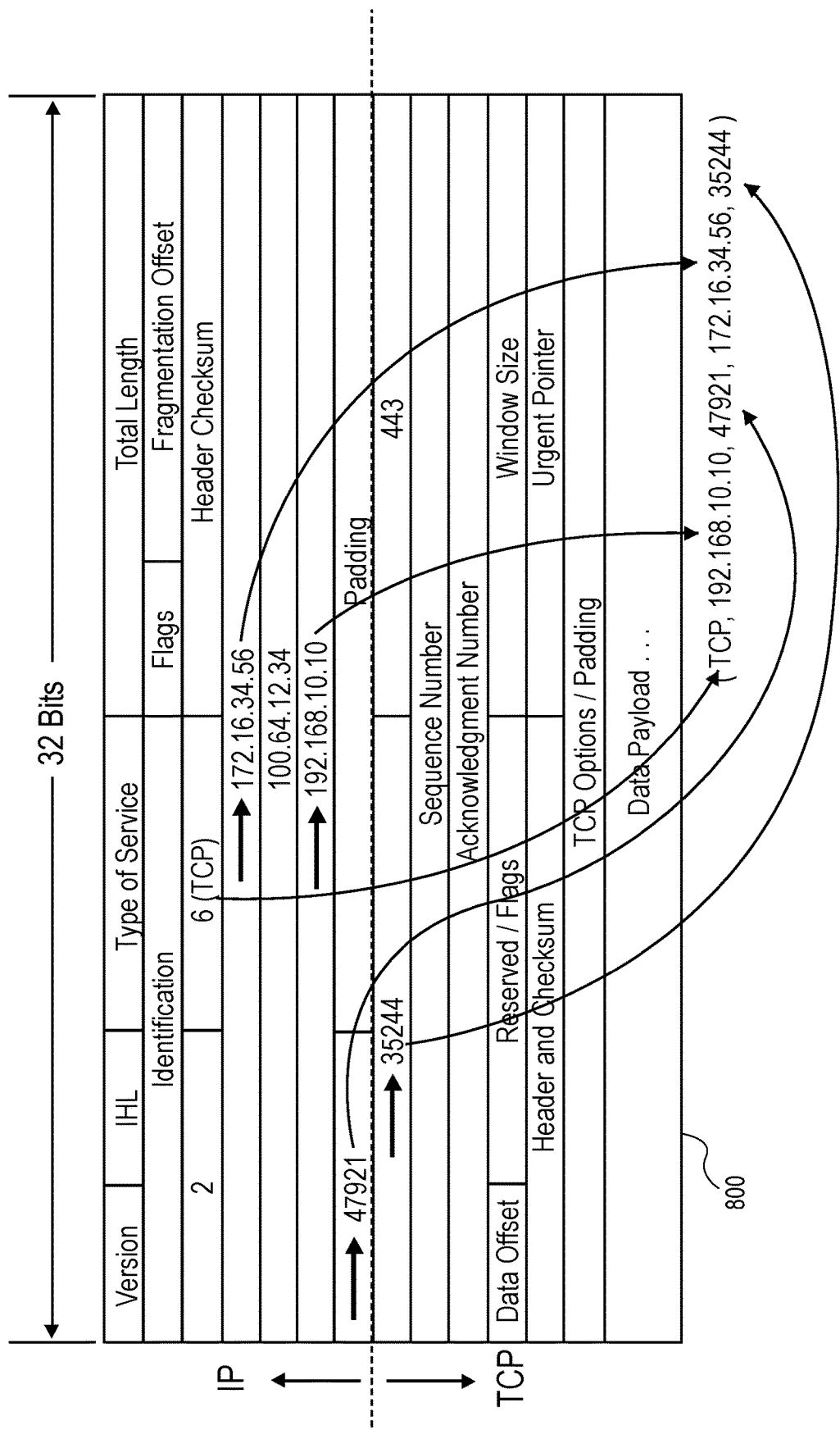
FIG. 8 is an example TCP/IPv4 packet diagram for a post-translation private breadcrumb packet that uses the IP options field to hold identifying information, according to various embodiments.

FIG. 8 is an example TCP/IPv4 packet diagram 800 for a post-translation private breadcrumb packet that uses the IP options field to hold identifying information according to various embodiments. In particular, the packet diagram 800 represents the packet depicted by the diagram 500 of FIG. 5 after having passed through a network address translator, such as the network address translator 130 of system 100, which processed the packet to translate or convert from the first addressing scheme of the first network 110 to the second addressing scheme of the second network 120. As shown, the network address translator 130 has translated the value in the IP source address field from 192.168.10.10 to 172.16.34.56 and has translated the value in the source port field from 47921 to 35244. Thus, in this example, the address of the sending source device when expressed in the first addressing scheme of the first network 110 is: IP source address=192.168.10.10 and source port number=47921; after translation, the address of the sending source device when expressed in the second addressing scheme of the second network 120 is: IP source address=172.16.34.56 and source port number=35244. Note that the first-addressing-scheme IP source address 192.168.10.10 and the source port number 47921 in the IP options field remain unchanged after having passed through the network address translator.

The translated private breadcrumb packet represented by the diagram 800 is received (see, e.g., operation 218 of FIG. 2), by a second sensor, e.g., the sensor B 150 of system 100, on the downstream side of the network address translator. The second sensor identifies it as a private breadcrumb packet based on its TTL value and/or based on a specific value(s) in some other predetermined field(s), such as its IP options field value. The second sensor proceeds to extract and report the values in the protocol, IP source address, source port number, and IP options fields. In particular, the second sensor reports the value extracted from the protocol field as the protocol, reports the value extracted from the IP source address field as the translated IP source address, and reports the value extracted from the source port number as the translated source port number. Further in the example of FIG. 8, the second sensor parses the values extracted from the IP options field and reports them as the pre-translated IP source address and pre-translated port number, respectively. The second sensor may report the extracted values, by way of non-limiting example, by forming and storing a five-tuple, e.g., (6, 192.168.10.10, 47921, 172.16.34.56, 35244), where the numeral 6 represents the TCP protocol, 192.168.10.10 is the pre-translated source IP address, 47921 is the pre-translated port number, 172.16.34.56 is the translated source IP address, and 35244 is the translated source port address. The exact format of the reporting is not critical, as long as it represents or indicates the association (e.g., the correlation or relationship) between the original source address from the protocol data unit (packet 500 in this example) with the translated source address from the private breadcrumb protocol data unit (private breadcrumb packet 800 in this example).

Figure 9:
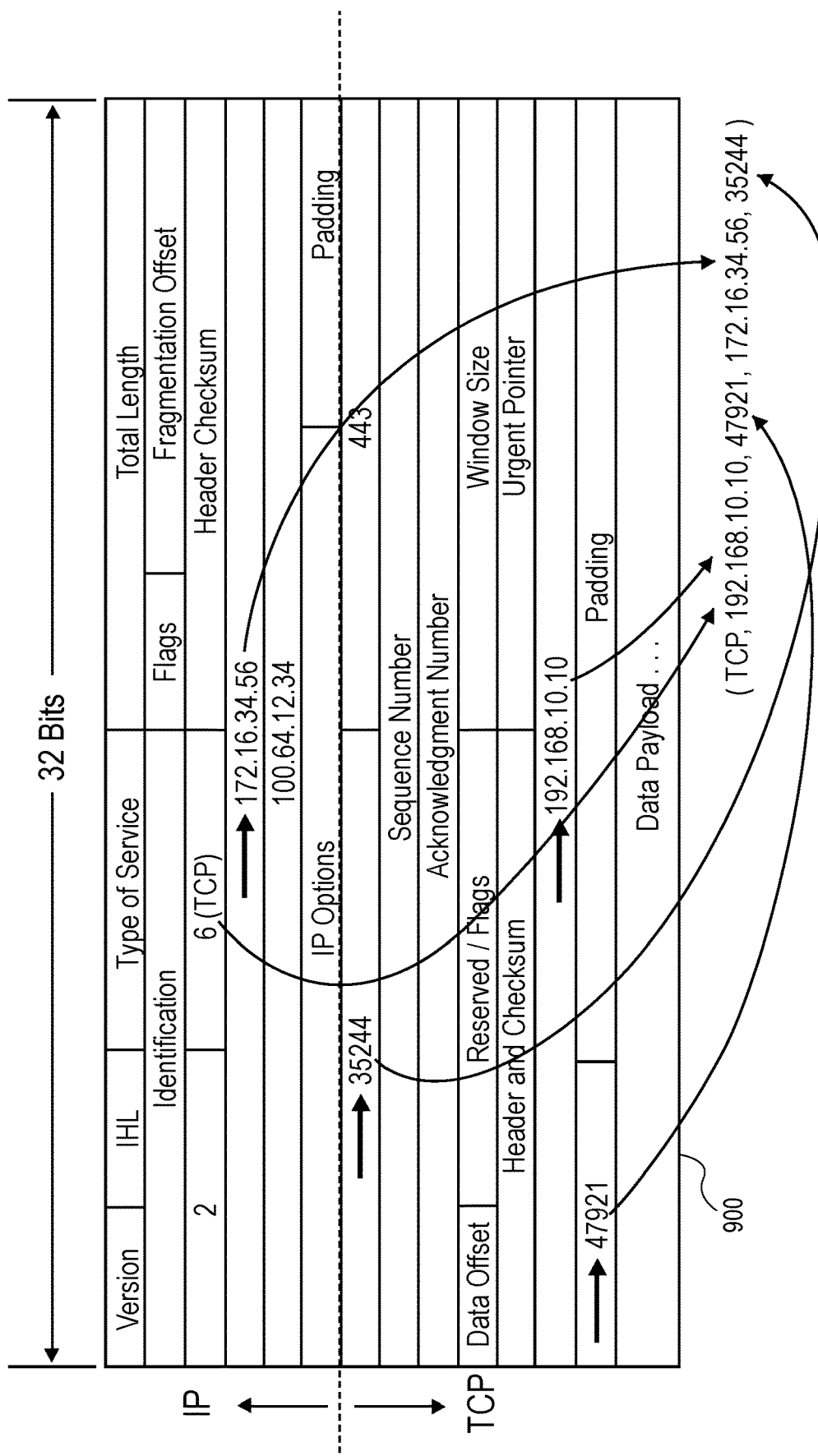
FIG. 9 is an example TCP/IPv4 packet diagram for a post-translation private breadcrumb packet that uses the TCP options field to hold identifying information, according to various embodiments.

FIG. 9 is an example TCP/IPv4 packet diagram 900 for a post-translation private breadcrumb packet that uses the TCP options field to hold identifying information, according to various embodiments. In particular, the packet diagram 900 represents the packet depicted by the diagram 600 of FIG. 6 after having passed through a network address translator, such as the network address translator 130 of system 100. Like the packet depicted by the diagram 800, the value in the IP source address field has been translated from 192.168.10.10 (first addressing scheme) to 172.16.34.56 (second addressing scheme) and the value in the source port field has been translated from 47921 (first addressing scheme) to 35244 (second addressing scheme). For the packet represented by the diagram 900, the IP source address 192.168.10.10 and the source port number 47921 in the TCP options field remain unchanged after having passed through the network address translator.

The translated private breadcrumb packet represented by the diagram 900 is received by a second sensor, e.g., the sensor B 150 of system 100, on the downstream side of the network address translator. Similar to the packet represented by the diagram 800, the second sensor identifies it as a private breadcrumb packet and extracts and reports the values in the protocol field, IP source address field, and source port number field, as the protocol, translated (e.g., second addressing scheme) IP source address, and translated source port numbers, respectively. For the packet represented by the diagram 900, however, the second sensor extracts, parses, and reports the values in the TCP options field as the pre-translated (e.g., first addressing scheme) IP source address and pre-translated port number, respectively. The second sensor may report the extracted values, by way of non-limiting example, by forming and storing a five-tuple, e.g., (6, 192.168.10.10, 47921, 172.16.34.56, 35244).

Figure 10:
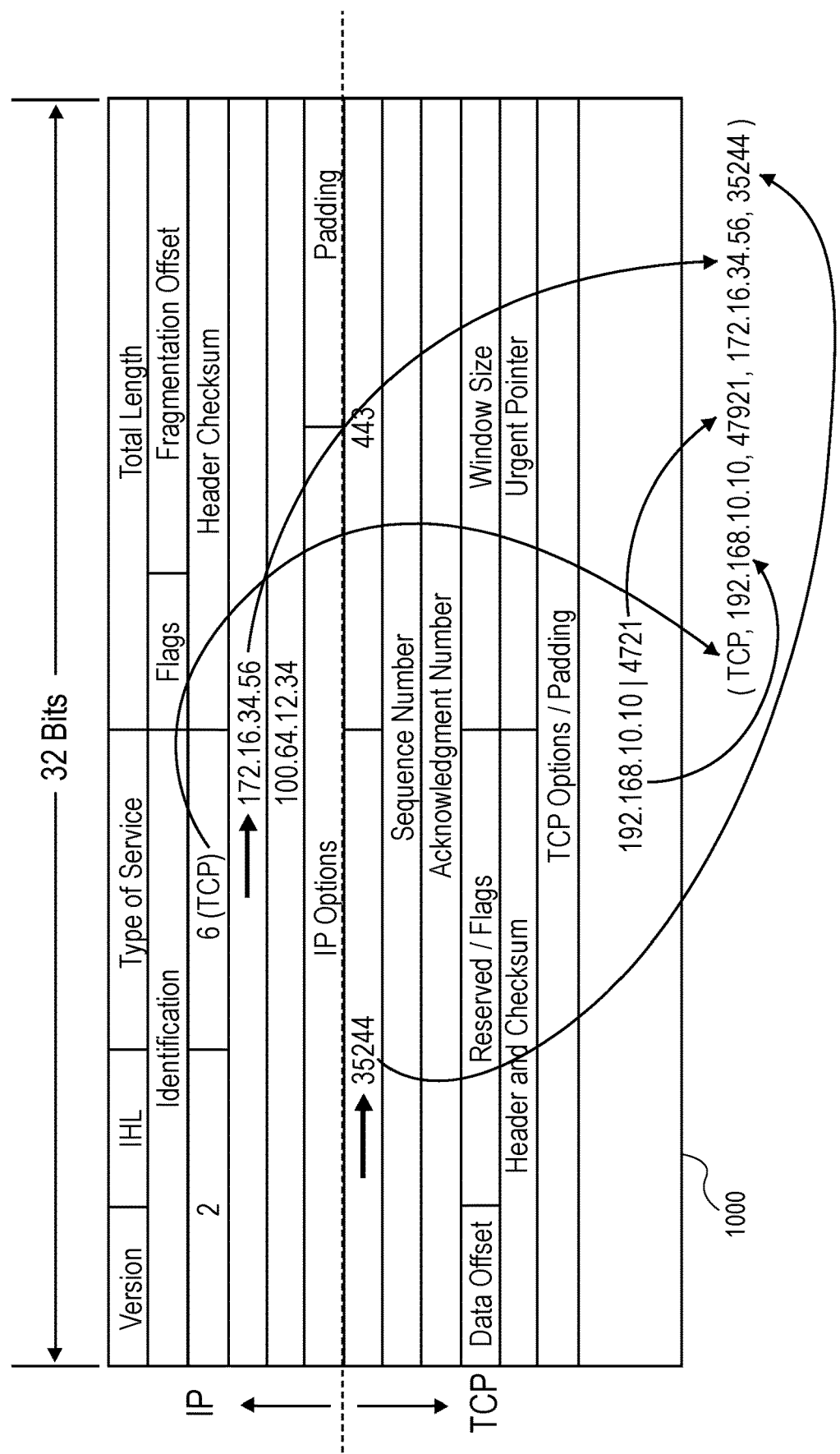
FIG. 10 is an example TCP/IPv4 packet diagram for a post-translation private breadcrumb packet that uses the data payload field to hold identifying information, according to various embodiments.

FIG. 10 is an example TCP/IPv4 packet diagram 1000 for a post-translation private breadcrumb packet that uses the data payload field to hold identifying information according to various embodiments. In particular, the packet diagram 1000 represents the packet depicted by the diagram 700 of FIG. 7 after having passed through a network address translator, such as the network address translator 130 of system 100. Like the packets depicted by the diagrams 800 and 900, the value in the IP source address field has been translated from 192.168.10.10 to 172.16.34.56 and the value in the source port field has been translated from 47921 to 35244. For the packet represented by the diagram 1000, the IP source address 192.168.10.10 and the source port number 47921 in the data payload field remain unchanged after having passed through the network address translator.

The translated private breadcrumb packet represented by the diagram 1000 is received by a second sensor, e.g., the sensor B 150 of system 100, on the other side of the network address translator. Similar to the packets represented by the diagrams 800 and 900, the second sensor identifies it as a private breadcrumb packet and extracts and reports the values in the protocol field, IP source address field, and source port number field, as the protocol, translated IP source address, and translated source port numbers, respectively. In the packet represented by the diagram 1000, this embodiment uses the data payload field as the translation-immune location for recording the source address and source port of the first protocol data unit—message packet 400. The second sensor extracts, parses, and reports the values in the data payload field as the pre-translated (first addressing scheme) IP source address and pre-translated port number, respectively. The second sensor may report the extracted values, by way of non-limiting example, by forming and storing a five-tuple, e.g., (6, 192.168.10.10, 47921, 172.16.34.56, 35244).

Figure 11:
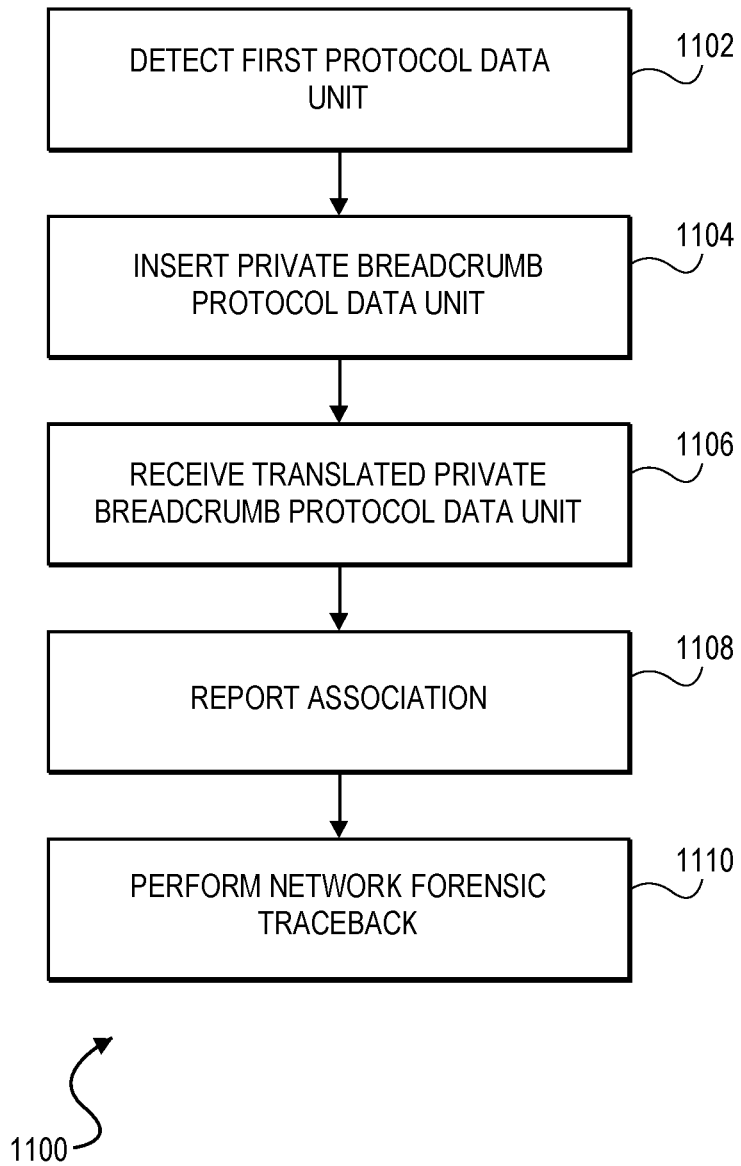
FIG. 11 is a flowchart for a method of identifying associated communications between a first network with a first addressing scheme and a second network with a second addressing scheme, according to various embodiments.

FIG. 11 is a flowchart for a method 1100 of identifying associated communications between a first network with a first addressing scheme and a second network with a second addressing scheme according to various embodiments. Method 1100 may be implemented using all or part a system such as system 100 as shown and described herein in reference to FIG. 1. In some embodiments, all or some of the operations shown in FIG. 11 may be implemented by a first sensor A 140 and a second sensor B 150, or by like devices.

At 1102, method 1100 detects a first protocol data unit. The protocol data unit may be part of a communication session, e.g., a message protocol data unit. By way of non-limiting example, the protocol data unit may be a protocol data unit 400 such as is shown and described herein in reference to FIG. 4. The protocol data unit may include a source address in the first addressing scheme in a source address field. The protocol data unit may be detects by a first sensor, such as the sensor A 140 as shown and described herein in reference to FIG. 1. The first sensor may be communicatively coupled to the first network with the first addressing scheme (e.g., first addressing scheme 110), between a gateway of the network and a network address translator (e.g., the network address translator 130). For example, the first sensor may be implemented as a dedicated device or implemented in a network endpoint that originates the first protocol data unit. The protocol data unit may be any protocol data unit type, e.g., a transport layer (e.g., TCP) segment, a network layer (e.g., IP) packet, a UDP datagram, or a data link layer (e.g., Ethernet or PPP) frame or cell.

At 1104, method 1100 inserts a private breadcrumb protocol data unit into the communication channel. The private breadcrumb protocol data unit may be the same type as the first protocol data unit. The private breadcrumb protocol data unit may include in its source address field the value from the source address field of first protocol data unit. The private breadcrumb protocol data unit may also include, in a field or fields immune from translation by a network address translator, a copy of the value from the source address field of the first protocol data unit. The private breadcrumb protocol data unit may be, by way of non-limiting example, any of the private breadcrumb protocol data units as shown and described herein in reference to FIG. 5, 6, or 7. The insertion may be performed by the first sensor, which may have created the private breadcrumb protocol data unit. In some embodiments, the private breadcrumb protocol data unit may further include, in its source port field, the value from the source port field of first protocol data unit. In such embodiments, the private breadcrumb protocol data unit may yet further include, in the field(s) immune from translation, a copy of the value from the source port field of the first protocol data unit.

At 1106, method 1100 receives a translated private breadcrumb protocol data unit, that is, a translation of the private breadcrumb protocol data unit inserted at 1104. The translation may have been performed by a network address translator. The translation may have replaced the source address in the source address field of the pre-translation private breadcrumb protocol data unit, (e.g., which was in the first addressing scheme 110) with a translated source address (e.g., which is in the second addressing scheme 120). In various embodiments, the translation will not have altered the data in specific field(s) of the private breadcrumb protocol data unit that are immune from translation by the network address translator, and as noted with regard to 1104, the original source address was written or otherwise included in such a field(s). The translated private breadcrumb protocol data unit may be received by a second sensor, such as the sensor B 150 as shown and described herein in reference to FIG. 1.

At 1108, method 1100 reports an association of the source address of the first protocol data unit with the translated source address of the first protocol data unit. The association may be in the form of the source address of the first protocol data unit and the translated source address represented in a data structure that indicates association between the two, e.g., a data structure that contains the original, untranslated source address according to the first addressing scheme 110 correlated with the translated source address according to the second addressing scheme 120. According to some embodiments, the association may further include a source port number and a translated source port number. According to some embodiments, the association may further include a protocol identifier. The report may be by way of storage in a data storage device, e.g., in persistent memory or in a local or remote database, or by way of sending an alert, e.g., an email or text message alert. In some embodiments, the report information may be stored in a memory that is accessible by a computerized device that utilizes the report information for purposes such as: forensic analysis of the network(s) (e.g., traceback), network technical troubleshooting, network optimization, security monitoring, and forensic investigation, such as the computer of a network administrator, technician, forensic investigator, or the like.

In the example shown in FIG. 11, at 1110, method 1100 performs a network forensic traceback using the association. The network forensic traceback may identify the original source of the protocol data units in a communication session of interest, e.g., including the first protocol data unit. Even though the protocol data units in a communication session of interest may be in a different addressing scheme (e.g., the second addressing scheme 120) when they are received, the system, or a different system with access to the report information, can determine the original source address (e.g., in the first addressing scheme 110) of the sending device based on the association between the original source address (and/or source port) and the translated source address (and/or translated source port) contained in the report information. According to some embodiments, the network forensic traceback may be performed when the communication session is part of a malicious action, such as a network attack, so as to correctly identify the address of the device that is performing the malicious action. Once the malicious device is correctly identified, a variety of actions can be taken to stop the malicious action, such as automatically reconfiguring the network (e.g., the second network 120) to reject or block any protocol data units that are sent by malicious device, among other actions.

As noted, according to various embodiments, the actions of 1110 may be replaced by, or supplemented with, different actions. Such different actions may include, for example, network troubleshooting actions, security monitoring actions, forensic analysis actions, and/or investigation actions.

As another example, some embodiments may enumerate or otherwise identify unique sources in order to map a community of interest based on a shared network resource. According to such embodiments, as a specific non-limiting example, a group of people that are in one or more networks that utilize one or more addressing schemes may have accessed a particular website in a network with a different addressing scheme. Embodiments can distinguish between, for example, one person or node visiting an external network resource a thousand times, versus a thousand different people or nodes accessing the network resource. Thus, such embodiments can perform network contact tracing and group correlation.

As yet another example, some embodiments may be used to track resource utilization, which in turn may be used for metering, rationing, or billing purposes. According to such embodiments, as a specific non-limiting example, an accounting system used in network with one addressing scheme may be able to properly attribute and account for factual utilization of a network resource in a different addressing scheme. Enumerating or otherwise identifying unique devices behind a network translation device may also have accounting or billing implications that could be taken advantage of by a service provider.

Thus, some embodiments can identify associated communications between a first network with a first addressing scheme and a second network with a second addressing scheme by using a combination of one or more of: (a) recognizing a data session, (b) generating a specially crafted protocol data unit that matches the communication format being used by the first network, (c) detecting the specially crafted protocol data unit after it transits a network translation device, (d) extracting the desired information from the translated specially crafted protocol data unit, and (e) using the information for any of a variety of network operations.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method of identifying an association between a network address in a first addressing scheme and a network address in a second addressing scheme, the method comprising:
    detecting a first protocol data unit from a first device in the first addressing scheme and addressed to a destination through the second addressing scheme;
    inserting an additional protocol data unit, the additional protocol data unit comprising, in a location subject to address translation by a network address translator, a source address of the first protocol data unit, the additional protocol data unit further comprising, in a location immune from address translation by the network address translator, the source address of the first protocol data unit;
    receiving a translated protocol data unit, wherein the translated data protocol unit comprises the additional data protocol unit after translation by the network address translator, wherein the translated protocol data unit comprises a translated source address of the first protocol data unit, and wherein the translated protocol data unit does not ever reach the destination; and
    reporting an association of the source address of the first protocol data unit with the translated source address of the first protocol data unit.

2. The method of claim 1, further comprising performing a network forensic traceback based on the association.

3. The method of claim 2, wherein the network forensic traceback comprises identifying an original source of protocol data units in a communication session of interest.

4. The method of claim 1, further comprising using the association to map a community of interest based on a shared network resource.

5. The method of claim 1, wherein the first device comprises a network communication endpoint, wherein the network address translator comprises a network address translator (NAT) device.

6. The method of claim 1,
    wherein the additional protocol data unit further comprises, in a location subject to address translation by the network address translator, a source port of the first protocol data unit, and wherein the additional protocol data unit further comprises, in a location immune from address translation by the network address translator, the source port of the first protocol data unit, wherein the translated protocol data unit further comprises a translated source port of the first protocol data unit, the method further comprising reporting an association of the source port of the first protocol data unit with the translated source port of the first protocol data unit.

7. The method of claim 1, wherein one of the first addressing scheme or the second addressing scheme comprises addressing for a private internet protocol address space, and wherein another of the first addressing scheme or the second addressing scheme comprises addressing for a global internet protocol address space.

8. The method of claim 1, wherein the first protocol data unit and the additional protocol data unit comprise network layer packets.

9. The method of claim 1, wherein the first protocol data unit and the additional protocol data unit comprise data link layer frames.

10. The method of claim 1, wherein one of the source address or the translated source address comprises a multi-protocol label switching (MPLS) label.

11. The method of claim 1, wherein the additional protocol data unit comprises data representing a predetermined time to live.

12. The method of claim 1, further comprising identifying the translated protocol data unit based on a specific value in a predetermined field of the translated protocol data unit.

13. The method of claim 1, further comprising generating the additional protocol data unit.

14. The method of claim 1, wherein the detecting and the inserting is performed by the first device.

15. A computer system for identifying an association between a network address in a first addressing scheme and a network address in a second addressing scheme, the system comprising:

a first sensor, comprising an electronic processor, the first sensor communicatively coupled to a first device to detect a first protocol data unit, wherein the first protocol data unit is addressed from the first device in the first addressing scheme and addressed to a destination through the second addressing scheme, wherein the first sensor is configured to insert an additional protocol data unit, the additional protocol data unit comprising, in a location subject to address translation by a network address translator, a source address of the first protocol data unit, the additional protocol data unit further comprising, in a location immune from address translation by the network address translator, the source address of the first protocol data unit; and a second sensor, comprising an electronic processor, communicatively coupled to the network address translator to receive a translated protocol data unit, wherein the translated data protocol unit comprises the additional data protocol unit after translation by the network address translator, wherein the translated protocol data unit comprises a translated source address of the first protocol data unit, wherein the translated protocol data unit does not ever reach the destination, wherein the computer system is configured to report an association of the source address of the first protocol data unit with the translated source address of the first protocol data unit.

16. The computer system of claim 15, wherein the computer system is further configured to perform a network forensic traceback based on the association.

17. The computer system of claim 16, wherein the network forensic traceback comprises identifying an original source of protocol data units in a communication session of interest.

18. The computer system of claim 15, wherein the computer system is further configured to use the association to map a community of interest based on a shared network resource.

19. The computer system of claim 15, wherein the first device comprises a network communication endpoint, and wherein the network address translator comprises a network address translator (NAT) device.

20. The computer system of claim 15, wherein the additional protocol data unit further comprises, in a location subject to address translation by the network address translator, a source port of the first protocol data unit, and wherein the additional protocol data unit further comprises, in a location immune from address translation by the network address translator, the source port of the first protocol data unit, wherein the translated protocol data unit further comprises a translated source port of the first protocol data unit, wherein the computer system is further configured to report an association of the source port of the first protocol data unit with the translated source port of the first protocol data unit.

21. The computer system of claim 15, wherein one of the first addressing scheme or the second addressing scheme comprises addressing for a private internet protocol address space, and wherein another of the first addressing scheme or the second addressing scheme comprises addressing for a global internet protocol address space.

22. The computer system of claim 15, wherein the first protocol data unit and the additional protocol data unit comprise network layer packets.

23. The computer system of claim 15, wherein the first protocol data unit and the additional protocol data unit comprise data link layer frames.

24. The computer system of claim 15, wherein one of the source address or the translated source address comprises a multi-protocol label switching (MPLS) label.

25. The computer system of claim 15, wherein the additional protocol data unit comprises data representing a predetermined time to live.

26. The computer system of claim 15, wherein the second sensor is configured to identify the translated protocol data unit based on a specific value in a predetermined field of the translated protocol data unit.

27. The computer system of claim 15, wherein the first sensor is configured to generate the additional protocol data unit.

28. The computer system of claim 15, wherein the first sensor is in the first device.

* * * * *